United States Patent
Wilson

[15] 3,693,994
[45] Sept. 26, 1972

[54] ARTICLE TRANSPORTING DEVICE

[72] Inventor: Eleanor A. Wilson, 350 W. David Rd., Dayton, Ohio 45429

[22] Filed: June 10, 1970

[21] Appl. No.: 45,182

[52] U.S. Cl. ............................ 280/36 R, 280/79.1
[51] Int. Cl. .......................................... B62b 11/00
[58] Field of Search..... 280/79.1, 79.2, 35, 37, 47.13, 280/47.16, 36, DIG. 3; 296/27

[56] References Cited

UNITED STATES PATENTS

| | | | |
|---|---|---|---|
| 2,132,316 | 10/1938 | Newton | 280/35 |
| 2,465,847 | 3/1949 | Coffey | 280/35 |
| 1,683,029 | 9/1928 | Fanger | 280/36 |
| 2,397,315 | 3/1946 | Harris | 280/47.13 |
| 2,849,241 | 8/1958 | Owens | 280/36 |
| 2,359,016 | 9/1944 | Wood | 280/35 |

Primary Examiner—Benjamin Hersh
Assistant Examiner—Robert R. Song
Attorney—Irvin V. Gleim, Edward M. Tritle and Francis M. Crawford

[57] ABSTRACT

Article carrying and transporting device includes a platform mounted on casters with side flap members extending upwardly from the platform for engagement with the sides of an article such as luggage, and readily detachable securing means for effecting a connection between the free ends of the flap members and across said article.

1 Claim, 3 Drawing Figures

ARTICLE TRANSPORTING DEVICE

BACKGROUND

The present invention relates to an improved article carrying and transporting device which is particularly useful to women, older people and young children as an aid in handling and/or transporting articles such as luggage or any article of such size or weight as to render it difficult to handle or lift.

I am aware that similar devices have been suggested heretofore, as exemplified by U.S. Pats. Nos. 1,547,914 — Herrick, 1,561,122 — Stahl, 2,228,066 — Tashbook, 2,596,578 — McIntyre et al, 2,716,558 — Sullivan, and 2,868,557 — Klipp et al.

While such prior art devices are capable of functioning in the manner and for the purpose for which they are intended, all such devices have disadvantages of one type or another. For example, the device disclosed in the aforesaid McIntyre et al patent involves considerable expense since the McIntyre device contemplates support structure including retractable wheels integral with the luggage itself. Additionally, such device is either incapable of supporting and transporting an item of which does not incorporate the Mcintyre device luggage or it would be very difficult to accomplish.

Accordingly, a principal object of the present invention is to provide an improved article carrying and transporting device in which the disadvantages of the prior art devices are obviated.

SUMMARY

In accordance with the present invention, support and/or transportation of any type or article of regular or irregular shape is accomplished by the provision of an improved device constructed of inexpensive materials which are readily available and easy to assemble or disassemble. The device includes an article-support platform mounted on at least four spaced apart casters and having a pair of article-retaining flap members extending upwardly from the platform. If desired, the flap members may include handles to facilitate lifting and/or maneuvering of the device.

DESCRIPTION

Other objects and advantages will become apparent from the following description taken in connection with the accompanying drawings, in which.

Figure 1:
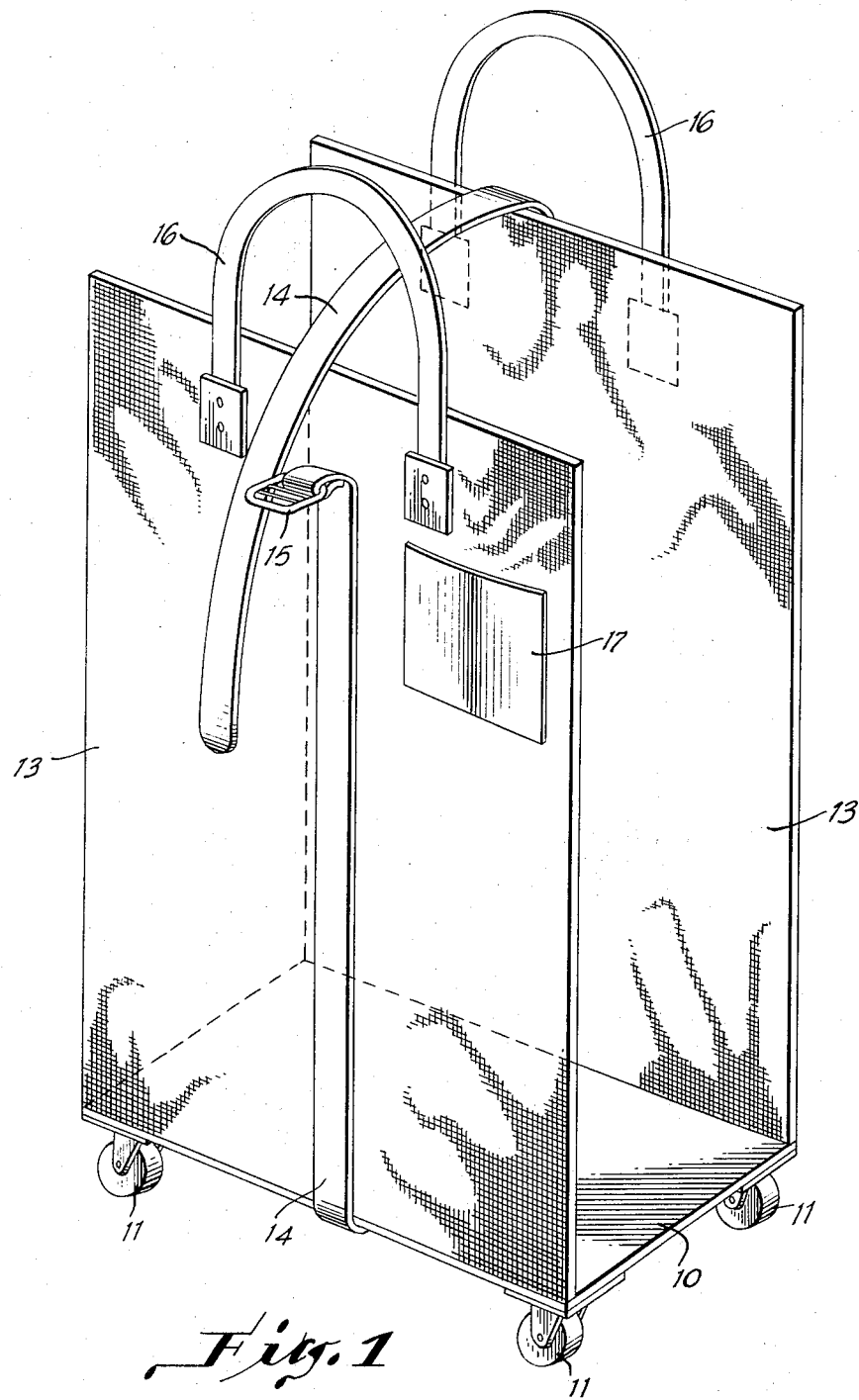
FIG. 1 is a perspective view showing an article carrying device embodying the present invention.

Referring to the drawings, an article transporting device in accordance with the present invention includes a platform member 10 of any suitable material such as wood, fiber board, plastic or the like. Swivel wheels or casters 11 are connected to the bottom of the platform member 10 at each of the four corners thereof by any convenient securing means such as threaded fasteners 12.

An article-retaining or flap member 13 is connected to the platform member and extends along and upwardly from one side thereof, and another flap member is similarly connected and extends along and upwardly from the opposite side of the platform. If desired, both flap members may be formed from a single piece of any desired material which extends across the bottom of the platform member. The flap members are connected to the platform member by any convenient connecting means such as adhesive, nails, tacks, screws, staples, or the like. Preferably, the flap members are formed of a flexible material such as canvas, vinyl plastic, or the like to enable the device to be folded to a substantially flat condition when it is not in use.

A strap 14 having at one end thereof securing means such as a buckle 15 is suitably fixed to the flap members 13 and/or to the platform member 10, for example, by stitching and/or staples or the like. If desired, handles 16 are similarly fixed to the flap members adjacent their upper or free ends. Additionally, if desired, one or both flap members may be provided with a pocket 17 for papers, documents, or other articles.

Figure 2:
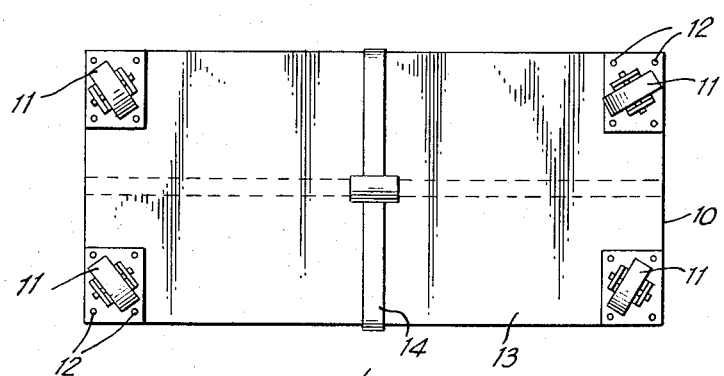
FIG. 2 is a bottom plan view of the embodiment of FIG. 1.
Figure 3:
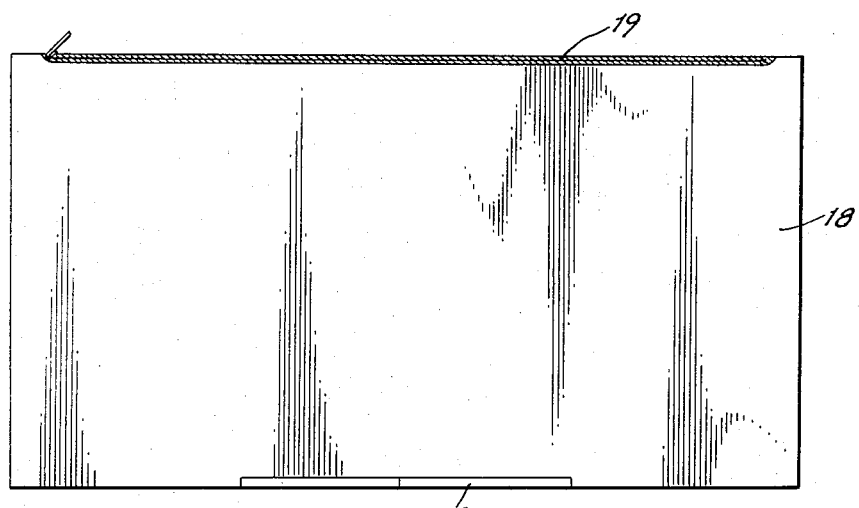
FIG. 3 is a side elevational view of an envelope for storing the embodiment of FIG. 1.

From the foregoing description, assembly, use and operation of my improved article transporting device should be evident. Assuming that the device has been folded to a substantially flat condition and placed within a storage envelope 18 having an opening along one edge thereof that can be closed by means such as a zipper 19 and having a second opening 20 along the opposite edge through which handles 16 can extend, the device is removed from said envelope and the wheels or casters 11 are placed on a supporting surface. An item of luggage or other article to be transported is then placed on the platform member 10. Flap members 13 are then extended upwardly along the sides of the luggage or other article which is then secured to the platform member by passing strap 14 across the top of the luggage or other article and thereafter said strap is secured to buckle 15. If desired, a second strap may be passed underneath the platform member, then upwardly along both ends of the luggage or other article then disposed on the platform, and secured across the top of the luggage or other article, as indicated by the dotted lines in FIG. 2.

Utility of an article transporting device embodying the present invention is not limited to items of luggage or other articles to be transported which have a regular shape. Irregularly shaped articles can be secured to the device in the above-described manner since the flexible side flaps 13 will conform to the shape of such irregularly shaped articles. Not only do the flaps cooperate with the strap or straps to secure an article to the platform but they also engage the sides of an article to be transported and thereby retain such article in a desired position relative to the platform. Additionally, the flexibility of the flaps enables the device to support and transport articles that are substantially greater in width than the corresponding width of the platform member. Of course, articles of any length can be supported and transported by the device since the ends thereof are open. Also, several articles can be stacked on top of one another if the length of the strap or straps is sufficient to pass over the top of such stacked articles and secured in the manner described above.

An article or articles thus secured to the device are supported thereby in a very stable manner even when unattended since the wheels or casters 11 are spaced apart and individually are attached to the platform at one of the corners thereof. The wheels or casters 11 are free to swivel through a full circle relative to their vertical swivel axes and the device is thereby highly maneuverable and can be easily pushed in any desired direction, and the handles provide means for lifting the device over curbs or other obstructions that may be encountered.

While a particular embodiment of the invention has been illustrated and described, it will be obvious to those skilled in the art that various changes and modifications may be made without departing from the present invention, and it is intended in the appended claims to cover all such changes and modifications that fall within the true spirit and scope of the invention.

What is claimed is:

1. An open-ended collapsible transporting device for luggage and the like comprising a support member having wheel means connected to the under side thereof, first and second flexible flap members each having a distal end and each having an opposite end connected to said support member along opposite sides of said support member, said flap members and said support member cooperatively forming a vehicle frame open at its opposite ends and having side walls engageable with an article to be transported when said flap members are extended upwardly from said support member and said article is positioned therebetween, means readily detachably interconnecting said distal ends of said flap members, and said interconnecting means including a flexible member having opposed distal ends and being connected to said support member at a location between said distal ends of said flexible member.

* * * * *